United States Patent
Waeller et al.

(10) Patent No.: US 10,144,285 B2
(45) Date of Patent: Dec. 4, 2018

(54) METHOD FOR OPERATING VEHICLE DEVICES AND OPERATING DEVICE FOR SUCH DEVICES

(75) Inventors: Christoph Waeller, Braunschweig (DE); Katharina Bachfischer, Düsseldorf (DE); Joerg Lilienthal, Gifhorn (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 12/377,082

(22) PCT Filed: Jul. 16, 2007

(86) PCT No.: PCT/EP2007/006274
§ 371 (c)(1),
(2), (4) Date: Feb. 10, 2009

(87) PCT Pub. No.: WO2008/025407
PCT Pub. Date: Mar. 6, 2008

(65) Prior Publication Data
US 2010/0149072 A1    Jun. 17, 2010

(30) Foreign Application Priority Data

Aug. 31, 2006 (DE) .......... 10 2006 040 946
Mar. 9, 2007 (DE) .......... 10 2007 011 543

(51) Int. Cl.
*B60K 35/00* (2006.01)
*B60K 37/00* (2006.01)
(Continued)

(52) U.S. Cl.
CPC .......... *B60K 35/00* (2013.01); *B60K 37/00* (2013.01); *B60K 37/06* (2013.01); *G06F 3/044* (2013.01);
(Continued)

(58) Field of Classification Search
CPC ........ B60K 35/00; B60K 37/00; B60K 37/06; B60K 2350/903; B60K 2350/1012;
(Continued)

(56) References Cited

U.S. PATENT DOCUMENTS

| 6,769,320 B1 | 8/2004 | Bollgohn et al. |
| 2004/0158374 A1 | 8/2004 | Suzuki |

(Continued)

FOREIGN PATENT DOCUMENTS

| DE | 10 2004 048 956 | 4/2006 |
| EP | 1 212 208 | 6/2002 |

(Continued)

OTHER PUBLICATIONS

International Search Report and Written Opinion of the International Searching Authority, PCT/EP2007/006274, dated Oct. 15, 2007 (English-language translation provided).

*Primary Examiner* — Keith L Crawley
(74) *Attorney, Agent, or Firm* — Hunton Andrews Kurth LLP

(57) ABSTRACT

In a method for operating vehicle devices in which different information is shown for different viewing angles on a display of a display device, seating positions of users are assigned to the viewing angles, the position of an object in a switching zone is detected and a switching signal assigned to the switching zone is generated, the seating position of a user assigned to the object is identified, and a control signal for the vehicle devices and/or the display device is generated as a function of the switching signal and of the seating position of the user who triggered the switching signal. Furthermore, an operating device for vehicle devices includes an input unit and a display unit having a display with which different information is able to be displayed for different viewing angles, seating positions of users being assigned to the respective viewing angles. The operating
(Continued)

device includes a device for detecting the position of an object in a switching zone, a device for identifying the seating position of a user assigned to the object, and a control device, with which a control signal is able to be generated for the vehicle devices and/or the display device as a function of the detected position of the object and of the seating position of the user.

25 Claims, 2 Drawing Sheets

(51) Int. Cl.
  *B60K 37/06* (2006.01)
  *G06F 3/041* (2006.01)
  *G06F 3/044* (2006.01)
(52) U.S. Cl.
  CPC .... *G06F 3/0416* (2013.01); *B60K 2350/1012* (2013.01); *B60K 2350/1028* (2013.01); *B60K 2350/1032* (2013.01); *B60K 2350/901* (2013.01); *B60K 2350/903* (2013.01); *G06F 2203/04803* (2013.01); *G09G 2380/10* (2013.01)
(58) Field of Classification Search
  CPC ...... B60K 2350/901; B60K 2350/1004; B60K 2350/1016; B60K 2350/1028; B60K 2350/962; G09G 5/00; G09G 2320/028; G09G 2320/068; G09G 2380/10; G06F 3/0416; G06F 3/044; G06F 3/0484; G06F 3/0488; G06F 3/04897; G06F 2203/04803
  USPC .......... 345/104, 156, 173–179, 184; 700/83; 340/461; 701/36, 200, 211
  See application file for complete search history.

(56) References Cited

U.S. PATENT DOCUMENTS

| | | | |
|---|---|---|---|
| 2006/0028453 A1* | 2/2006 | Kawabe | 345/173 |
| 2006/0066507 A1 | 3/2006 | Yanagisawa | |
| 2006/0220788 A1* | 10/2006 | Dietz et al. | 340/5.74 |
| 2007/0262965 A1* | 11/2007 | Hirai | B60R 11/0235 |
| | | | 345/173 |
| 2007/0297064 A1* | 12/2007 | Watanabe | B60K 35/00 |
| | | | 359/630 |
| 2008/0068284 A1* | 3/2008 | Watanabe et al. | 345/1.1 |
| 2008/0133122 A1* | 6/2008 | Mashitani | G01C 21/36 |
| | | | 701/456 |

FOREIGN PATENT DOCUMENTS

| | | | | |
|---|---|---|---|---|
| JP | 2005-71286 | | 3/2005 | |
| WO | WO 2004/081777 | | 9/2004 | |
| WO | WO2006027924 | * | 3/2006 | ............. G06F 3/041 |
| WO | WO 2006/046783 | * | 5/2006 | ............. G06F 3/041 |

* cited by examiner

METHOD FOR OPERATING VEHICLE DEVICES AND OPERATING DEVICE FOR SUCH DEVICES

FIELD OF THE INVENTION

The present invention relates to a method for operating vehicle devices in which different information is shown for different viewing angles on one display of a display device. In this context, seating positions of users are assigned to the respective viewing angles. Furthermore, the present invention relates to an operating device for vehicle devices having an input unit and such a display device.

BACKGROUND INFORMATION

Display devices having a display which uses an optical barrier to display a different image to the viewer to the right and left of the middle viewing direction, respectively, are commercially available. They are distributed by the company Sharp, for example, under the name dual-view display. It is known to use such dual-view displays in a motor vehicle in order to display to the driver information that is different than that displayed to the front-seat passenger. For example, the display of a navigation system may be made available to the driver, while the front-seat passenger may simultaneously watch a film.

A disadvantage of using such a dual-view display in a motor vehicle is that problems result when they are used in a motor vehicle along with traditional operating devices or operating methods that use the display device to illustrate the operator action while in operation.

SUMMARY

Example embodiments of the present invention provide a method for operating vehicle devices and an operating device for such devices that may be used in conjunction with the display device mentioned above.

In the method according to example embodiments of the present invention, the position of an object is detected in a switching zone and a switching signal assigned to the switching zone is generated. The seating position of a user assigned to the object is identified, and a control signal for the vehicle devices and/or the display device is generated as a function of the switching signal and the seating position of the user who triggered the switching signal.

For example, a viewing angle for the display is assigned to the seating position of the user who triggered the switching signal, and the information shown on the display is modified only for the viewing angle of this user. According to example embodiments of the present invention, the triggering of the switching signal may thus be illustrated graphically on the display such that only the user who performs the operator action perceives the information associated with this operator action. In particular, a user in another seating position is not disturbed in the perception of the information shown for his viewing angle, because it may remain unchanged during the operator action.

The switching zone is formed by a surface of the display and/or a region directly in front of this surface, for example. This surface of the display displays, for example, an operating function that is activated by bringing a detectable object into the switching zone of this operating function. The position of the object may be detected in that contact with a surface of the display is detected, for example.

Furthermore, the switching zone may be assigned to at least one operating element that is offset from the display. In this case, the operating function and the identification of the object may be implemented by bringing the object close to the operating element or by the object touching the operating element. Furthermore, it is also possible for the switching zone to be used only to identify the user. The actual operating function is selected by activating the operating element itself, optionally as a function of the seating position of the user. In this case, the operating element may be a traditional operating element, such as a mechanical switch. The mechanical switch may be a rotary switch. Furthermore, a multifunction operating device could be used, as described in European Patent No. 1 212 208, for example.

According to example embodiments, the object is a body part of a user, in particular a finger or the finger tip of a user. In this case, the position of the object, that is, the finger of the user, may be detected through a capacitive coupling between the object and receiving device disposed near the switching zone. The receiving device may be located outside of the display. However, the receiving device may be included in the display device, in particular in the display or the offset operating element. If the receiving device is included in the display, the user's finger that is located in front of an operating function shown on the display may be detected. In this context, the finger may touch the display; however, this is not necessarily required. For the capacitive coupling with the receiving device, it is sufficient for the finger to be located a certain distance in front of the display.

According to example embodiments of the method, the seating position of the user assigned to the object is identified in that an identification code is capacitively coupled to the body of the user via an electrode device and capacitively decoupled from the body of the user at the receiving device. In this context, the identification code is in particular able to be coupled into the body of a user only if this user is sitting in a seating position that is assigned to the electrode device. The identification code may thus be transmitted by quasi electrostatic fields to the receiving device via the body of the user. One capacitor device may be used in the interfaces between the electrode device and the user, and between the user and the receiving device, respectively, which capacitor device is integrated into a resonant circuit that is operated as a parallel resonant circuit in the receiving device and as a series resonant circuit in the electrode device.

The identification code may identify the user and/or the seating position, for example. If the identification code identifies the user, the switching signal of at least one control button may be generated only when it is activated by a user. A user-selective operating method may be implemented in this manner. Additionally, the type of information displayed for a viewing angle may be a function of the identification code of the user in the seating position assigned to this viewing angle. Thus, in the method according to example embodiments of the present invention it is possible for the decision regarding whether specific information is allowed to be displayed to be a function of the seating position. For example, in this manner, it is possible to prevent a film from being displayed for the driver's viewing angle while the vehicle is being driven.

The layout of virtual operating objects, such as control buttons, that are displayed on the display, is traditionally optimized for operation by the driver. The ergonomics of the arrangement of the operating objects is accordingly worse for the front-seat passenger. Using the method according to example embodiments of the present invention, it is possible to provide respectively ergonomically optimized placements of the operating objects, even if the driver and the front-seat passenger use the same application. For example, for the driver, the operating objects may be shown further to one side of the display and somewhat larger, whereas the operating objects for the front-seat passenger are shown further to his side and somewhat smaller.

The operating device according to example embodiments of the present invention includes a device for detecting the position of an object in a switching zone, a device for identifying the seating position of a user assigned to the object, and a control device, with which a control signal is able to be generated for the vehicle devices and/or the display device as a function of the detected position of the object and of the seating position of the user. In particular, the control signal changes the information shown on the display only for the viewing angle of the identified seating position. The switching zone is formed by a surface of the display and/or a region directly in front of this surface, for example.

The operating device according to example embodiments of the present invention thus makes it possible to operate an interactive application in which specific operating steps are visualized on the display, it being possible for a user to perform the operating on the display, the visualization of the operator action being visible only to the user performing the operator action. The dual-view display of the operating device according to example embodiments of the present invention is thus expanded by a separate operating function for different users. For example, through the identification of the user, the front-seat passenger may perform operating functions on the display and navigate extensively in menus that are shown on the display for one viewing angle without this being visible for the driver's viewing angle and without the display having to change for the driver.

According to example embodiments of the operating device according to the present invention, the position detecting device includes a touch-sensitive surface of the display. The location where the object is touched on the display is thus detected and assigned to an operating function that was being displayed just then.

According to example embodiments, the operating device includes at least one operating element that is separate from the display. In this case, the switching zone may be assigned to the offset operating element. On the basis of the position of the object at the switching zone, that is, near the offset operating element, it is detected which operating element is to be activated. At the same time, the seating position of the user assigned to the object may be identified. In this manner, it is possible to display on the display information for the relevant operating element only for the viewing angle of the identified seating position. The control signal may then derive from the activation of the operating element and possibly from the seating position of the user. The operating element may be a traditional operating element, a mechanical operating element, for example. For example, it is possible to use a rotary switch or a multifunction operating device, as described in European Patent No. 1 212 208.

According to example embodiments, the position detecting device includes a receiving device, to which a signal from a user may be transmitted capacitively if the object, in particular a body part of the user, is located near the receiving device. The capacitive transmission ensues, as explained above, via quasi electrostatic fields, from the body of the user to the receiving device.

Furthermore, the identification device may include an electrode device in the seats of potential users, via which an identification code may be capacitively coupled into the body of the user and may be capacitively decoupled at the receiving device. In this case as well, quasi electrostatic reciprocal effects between the body of the user and the electrode device and the receiving device, respectively, are utilized.

The capacitive coupling between the object, in particular the body part, for example, the finger of a user, may be designed so sensitively that it is not necessary for the object to touch the display surface, for example. It suffices for the object to be located in a specific switching zone in front of the display.

The method according to example embodiments of the present invention or the operating device according to example embodiments of the present invention may reduce a possibility of distracting the driver by information shown on the display. Furthermore, the private sphere may be increased for a vehicle occupant, for example, for a front-seat passenger, because personal data may be displayed for him without other vehicle occupants being able to view them. This is advantageous for an application in a taxi, for example.

Furthermore, during the journey it is possible to exclude the driver from specific operating options that would lead to a distraction during the journey. In this context, the same information may be provided to the driver and to the front-seat passenger via the display device. However, the driver may not access specific operating options.

The identification of the user, which may ensue via a simple touching of the display, for example, may be used to show this user's personal content for a specific viewing angle.

Furthermore, an individual user profile of the identified user may be activated. Furthermore, specific groups of people, such as children, may be excluded from specific operating functions.

Using the method according to example embodiments of the present invention and the operating device according to example embodiments of the present invention, it is not only possible to show two separate applications on one single display, but also to operate two applications on one single display.

Example embodiments of the present invention are explained in more detail below with reference to the appended Figures.

DETAILED DESCRIPTION

The operating device of the exemplary embodiment is accommodated in the region of the center console of a motor vehicle. It includes a display device having a display 1, via which information may be displayed to the driver and to other vehicle occupants. Furthermore, the driver and other vehicle occupants, in particular the front-seat passenger, may control vehicle devices via the operating device in that they perform certain inputs.

Vehicle devices include the display device itself as well as, for example, a navigation device, communication devices, such as a mobile phone; multimedia applications, such as music reproduction; a front-seat passenger infotainment system, an infotainment system for the occupants of the rear passenger compartment, a television or a photo viewer, as well as system devices of the motor vehicle itself. For example, system devices may include the heating and ventilation devices, as well as an air conditioner, the adjustment of mirrors and seats, as well as other devices that may be controlled from the inside of the motor vehicle.

Figure 1:
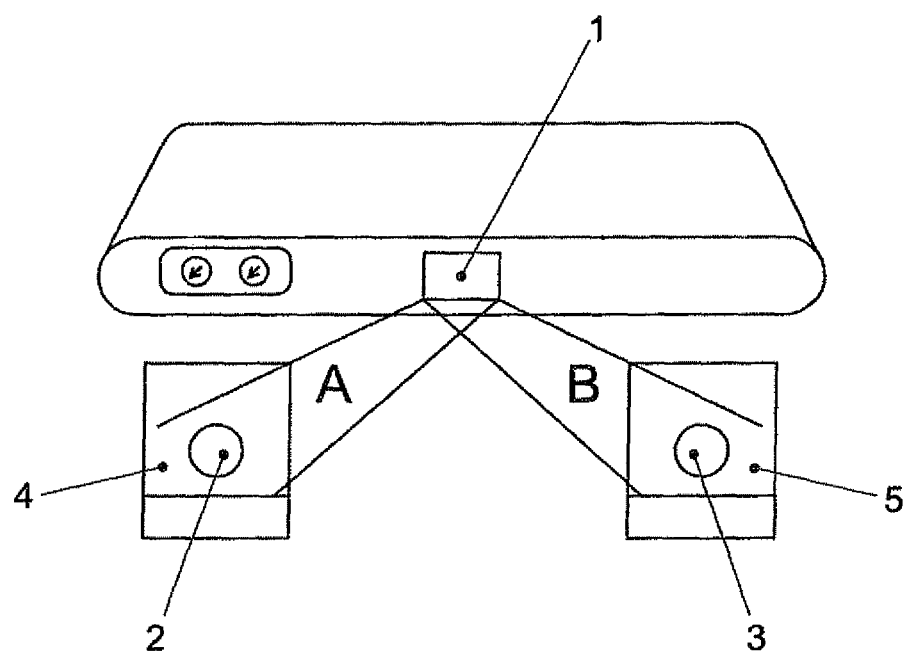
FIG. 1 shows the display device of an operating device according to an example embodiment of the present invention.

In display 1 of the display device, it is possible to display different content to a viewer to the right and left of the middle viewing direction, respectively, through an optical barrier. As may be seen from FIG. 1, a driver 2, who sits in driver's seat 4, views display 1 from a viewing angle A, whereas front-seat passenger 3, who sits in a front passenger's seat 5, views display 1 from a viewing angle B. The optical barrier of display 1 is disposed such that the driver may see a different display from region A than front-seat passenger 3 sees from region B. Display 1 is thus able to be triggered such that it is possible to show different information for driver 2 and front-seat passenger 3. In this context, the seating position of driver 2 is assigned to viewing angle A and the seating position of front-seat passenger 3 to viewing angle B.

Operating functions are displayed on specific surfaces on display 1 for the operation of the devices and the display device of the vehicle. In this context, it is possible to display different operating functions for each viewing angle A, B. The following explains how a specific operating function displayed on a surface of display 1 for a specific viewing angle may be activated by a user. In this context, it is assumed that the display content displayed to front-seat passenger 3 for his viewing angle B is not the same as that which is displayed to driver 2.

Figure 2:
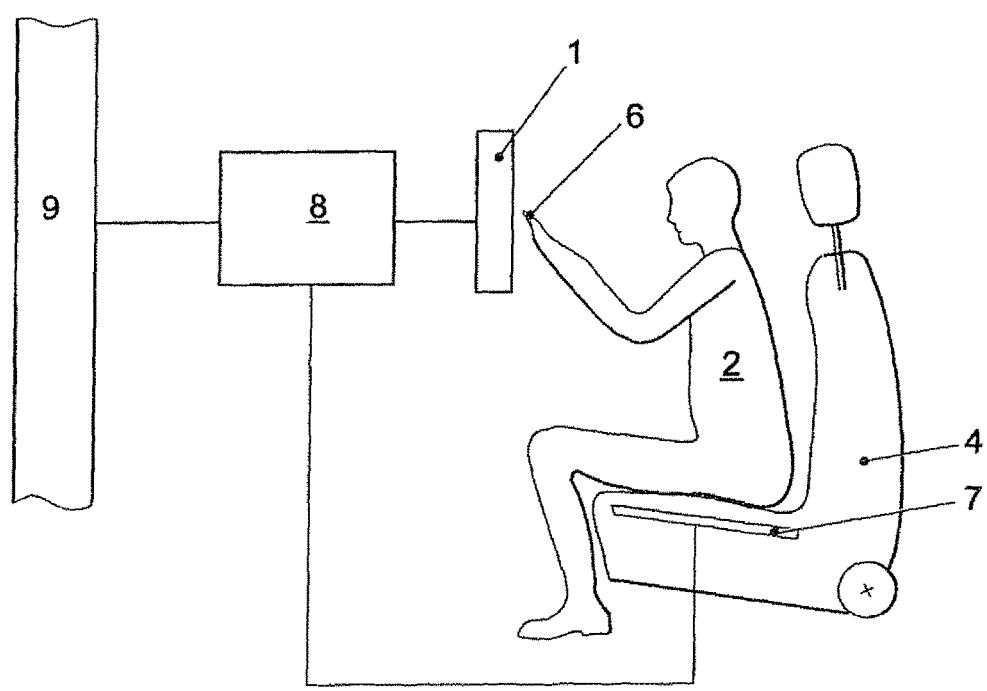
FIG. 2 illustrates the exemplary embodiment of the operating device and of the operating method.

As shown in FIG. 2, in order to activate a specific operating function, driver 2 moves a finger tip 6 toward the region of display 1 in which the operating function to be activated is displayed, for example. As soon as finger tip 6 is located in a switching zone in front of the corresponding surface of the display, on the one hand, it is detected that an object, in this case, finger tip 6, is located in the switching zone, and on the other hand, the seating position of user 2 and alternatively or additionally user 2 himself is identified. This position determination and identification of the seating position is explained in the following with reference to FIG. 2.

An electrode array 7 is located in seat 4 of driver 2. This electrode array 7 may be used to capacitively couple an identification code into the body of driver 2. In this context, the identification code may identify the seating position of user 2 as well as user 2 himself. The identification code is transmitted via the body of driver 2 and capacitively decoupled at finger tip 6, so that it may be transmitted to a receiving device accommodated in the display device, in particular in display 1.

The receiving device is connected to a control device 8, which in turn is capacitively coupled to electrode device 7. An electric field having a very limited range of several centimeters or decimeters, for example, is used for the capacitive couplings between electrode device 7 and driver 2 on the one hand, and driver 2 and the receiving device in the display device on the other hand. The range of this field determines the size of the switching zone in front of the display surface on which the operating function is displayed. Relatively low carrier frequencies of several 100 kH are used for the signal transmission, which lead to quasi-static fields, that is, fields for which for the most part the physical principles that apply for static fields are valid. With regard to further details of this signal transmission, reference is made to German Published Patent Application No. 10 2004 048 956 and the additional literature cited therein, which are expressly incorporated herein in their entireties by reference thereto. In particular, the switching devices described in German Published Patent Application No. 10 2004 048 956 may be used.

If the position of finger tip 6 of driver 2 has been detected in a switching zone, a switching signal is generated that is assigned to this switching zone.

For example, the position of the finger tip of front-seat passenger 3 is detected and his seating position identified in the same manner as are those of driver 2. When an operating function is activated, the information regarding the position from which a switching zone was activated, and optionally regarding who activated which switching zone, is thus available in the control device. The control device may generate a control signal for the vehicle devices or for the display device from the display of the operating function for the viewing angle for this seating position.

For example, if front-seat passenger 3 has activated an operating function with which the temperature of a climate-control device is to be changed, control device 8 generates a control signal for the climate-control device, via which the temperature is accordingly adjusted on the side of front-seat passenger 3. This control signal may be transmitted from control device 8 to the climate-control device of the vehicle via a vehicle bus 9.

Furthermore, more complex operator actions, such as navigating through menus that are displayed on display 1 of the control device, may be controlled by control device 8. In this case, the control signal modifies the information displayed on display 1 for the viewing angle of the seating position from which the operating function was activated. Thus, for example, the menu of the navigation device for viewing angle A is displayed to driver 2, without influencing the display for viewing angle B. Driver 2 may use his finger tips 6 to navigate through the menus of the navigation device, in that he puts his finger tips 6 in front of the corresponding surfaces of display 1. The corresponding operator action is consequently displayed only for viewing angle A, since the seating position of user 2 doing the activating is identified.

A list of operating functions that are not allowed to be activated by specific user groups or from specific seating positions is stored in control device 8. One group of operating functions includes the applications that may lead to an excessively strong distraction of the driver. If it is detected during an activation of an operating function that the operating is to be triggered from the seating position of driver 2, no switching signal is generated for this operating function so that this operating function may not be activated from the seating position of driver 2. For example, driver 2 may not be permitted to call up specific points of interest in the navigation device. Furthermore, applications such as film and photo viewing may be blocked for driver 2.

Furthermore, through the identification of the user, it is possible to detect whether, for example, a child wants to activate the operating function. Specific applications, such as the activation of the navigation device, may be blocked for this user group.

According to exemplary embodiments, the operating function is not activated via display 1, but rather via a separate operating element that is offset from display 1. This operating element may be a multifunction operating device, for example, as described in European Patent No. 1 212 208. As in the preceding exemplary embodiment, display 1 shows different functions for each viewing angle A, B. In contrast to the preceding exemplary embodiment, however, these operating functions are not activated by moving a finger tip 6 toward the area of display 1 in which the operating function to be activated is displayed. Rather, the offset operating element is activated by driver 2 or front-seat passenger 3. As in the preceding exemplary embodiment, the user, that is, driver 2 or front-seat passenger 3, is identified using a receiving device that is accommodated in the offset operating element. In this manner, the display device may still be controlled such that the information relevant for the operator action is displayed on display 1 only for the viewing angle of the seating position from which the operating function is activated. The advantage of using an offset operating element for the activation is that the information that is shown for a seating position from which no activating is presently being performed is not disturbed by the operation of the display device using a touch-sensitive display.

Additional features that were explained with regard to the preceding exemplary embodiment may accordingly also be implemented in the additional exemplary embodiment having the offset operating element.

LIST OF REFERENCE NUMERALS

1 display
2 driver
3 front-seat passenger
4 driver's seat
5 front passenger's seat
6 finger tips of a user
7 electrode device
8 control device
9 vehicle bus

What is claimed is:

1. A method for operating a vehicle device, comprising:
   selectively displaying, on a display of a display device, information for at least two different viewing angles, different seating positions of users being assigned to each of the viewing angles;
   adjusting placement of at least one specified control button displayed on the display for each of the at least two different respective viewing angles ergonomically to the seating position assigned to each of the at least two respective viewing angles, wherein the at least one specified control button displayed on the display is simultaneously displayed in one of a different position and a different size for the seating positions assigned to each of the at least two different respective viewing angles;
   detecting a position of an object in a switching zone;
   generating a switching signal assigned to the switching zone in accordance with the detection of the position of the object in the switching zone;
   identifying the user of the object and the seating position of the user assigned to the object, wherein the identity of the user is independent of the user's seating position; and
   generating a control signal for at least one of (a) the vehicle device and (b) the display device as a function of the switching signal, the user, and the seating position of the user who triggered the switching signal.

2. The method according to claim 1, further comprising:
   assigning a viewing angle for the display to the seating position of the user who triggered the switching signal; and
   modifying the information shown on the display only for the viewing angle of the user who triggered the switching signal.

3. The method according to claim 1, wherein the switching zone corresponds to at least one of (a) a surface of the display and (b) a region directly in front of the surface of the display.

4. The method according to claim 3, further comprising displaying, on the surface of the display assigned to a switching zone, an operating function that is activatable by a detectable object being moved into the switching zone of the operating function.

5. The method according to claim 1, wherein the detecting includes detecting a touching of a surface of the display.

6. The method according to claim 1, wherein the switching zone is assigned to at least one operating element that is offset from the display.

7. The method according to claim 1, wherein the object includes a body part of a user.

8. The method according to claim 1, wherein the detecting includes detecting the position of the object by a capacitive coupling between the object and a receiving device arranged in the switching zone.

9. The method according to claim 8, wherein at least one of (a) the display device and (b) an offset operating element includes the receiving device.

10. The method according to claim 1, wherein the seating position of the user is identified in accordance with an identification code capacitively coupled into a body of the user using an electrode device and capacitively decoupled at a receiving device.

11. The method according to claim 10, wherein the identification code is capacitively coupleable into the body of a user only if the user is sitting in a seating position that is assigned to the electrode device.

12. The method according to claim 10, wherein the identification code identifies at least one of (a) the user and (b) the seating position.

13. The method according to claim 12, wherein the generating includes generating the switching signal of at least one control button only when the control button is activated by a specific user.

14. The method according to claim 12, wherein a type of information displayed for a viewing angle is a function of the identification code of the user in the seating position assigned to the viewing angle.

15. The method according to claim 1, wherein the generating includes generating the switching signal of at least one control button only when the control button is activated by a user in a specific seating position.

16. An operating device for a vehicle device, comprising:
   an input unit;
   a display device including a display configured to display information for at least two different viewing angles, different seating positions of users being assigned to each viewing angle, wherein placement of at least one specified control button displayed on the display device for each of the at least two different respective viewing angles is adjusted to be ergonomic to the seating position assigned to each of the at least two different respective viewing angles, wherein the at least one specified control button displayed on the display is simultaneously displayed in one of a different position and a different size for the seating positions assigned to each of the at least two respective viewing angles;
   a detection device adapted to detect a position of an object in a switching zone;

an identification device adapted to identify the user of the object and the seating position of a user assigned to the object, wherein the identity of the user is independent of the user's seating position; and a control device adapted to generate a control signal for at least one of (a) the vehicle device and (b) the display device as a function of the detected position of the object, the user, and of the seating position of the user.

17. The operating device according to claim 16, wherein the display device is adapted to change the information displayed on the display based on the control signal only for the viewing angle of the identified seating position.

18. The operating device according to claim 16, wherein the switching zone corresponds to at least one of (a) a surface of the display and (b) a region directly in front of the surface.

19. The operating device according to claim 16, wherein the detection device includes a touch-sensitive surface of the display.

20. The operating device according to claim 16, further comprising at least one operating element that is offset from the display.

21. The operating device according to claim 20, wherein the switching zone is assigned to the offset operating element.

22. The operating device according to claim 16, wherein the object includes a body part of a user.

23. The operating device according to claim 16, wherein the detection device includes a reception device adapted to receive a signal from a user transmitted capacitively if a body part of the user is located near the reception device.

24. The operating device according to claim 23, wherein the identification device includes an electrode device in seats of potential users via which an identification code is capacitively coupleable into the body of the user and capacitively decoupleable at the reception device.

25. The method according to claim 8, wherein an offset operating element includes the receiving device.

\* \* \* \* \*